(12) United States Patent
Larsson et al.

(10) Patent No.: US 12,228,781 B2
(45) Date of Patent: Feb. 18, 2025

(54) NETWORK ACCESS POINT (NAP) ENCLOSURES

(71) Applicant: PPC BROADBAND, INC., East Syracuse, NY (US)

(72) Inventors: Nicholas B. Larsson, Blomkest, MN (US); William L. Crawford, Syracuse, NY (US); Ruta Mangle, East Syracuse, NY (US); Cameron Adams, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/749,975

(22) Filed: May 20, 2022

(65) Prior Publication Data

US 2022/0397733 A1    Dec. 15, 2022

Related U.S. Application Data

(60) Provisional application No. 63/295,341, filed on Dec. 30, 2021, provisional application No. 63/191,258, filed on May 20, 2021.

(51) Int. Cl.
G02B 6/44    (2006.01)
(52) U.S. Cl.
CPC ......... *G02B 6/4452* (2013.01); *G02B 6/4442* (2013.01)
(58) Field of Classification Search
CPC ............................ G02B 6/4442; G02B 6/4452
See application file for complete search history.

(56) References Cited

U.S. PATENT DOCUMENTS

| 9,052,474 B2 | 6/2015 | Jiang et al. |
| 11,150,427 B2 * | 10/2021 | Paddick ............... G02B 6/4441 |
| 2022/0365304 A1 * | 11/2022 | Wittmeier ............ G02B 6/4455 |

FOREIGN PATENT DOCUMENTS

| EP | 0159857 A1 | 10/1985 |
| EP | 3809179 A1 | 4/2021 |
| TW | M466405 U | 11/2013 |
| WO | 2019079434 A1 | 4/2019 |

OTHER PUBLICATIONS

International Search Report and Written Opinion dated Aug. 22, 2022 in corresponding International Application No. PCT/US2022/030342, 13 pages.
Taiwanese Office Action mailed Dec. 3, 2024 in corresponding Taiwanese Application No. 111118996, 9 pages.

* cited by examiner

*Primary Examiner* — Sung H Pak
(74) *Attorney, Agent, or Firm* — MH2 TECHNOLOGY LAW GROUP LLP

(57) ABSTRACT

A network access point enclosure is configured to house a splice tray that is configured to pivot to provide increased access to opposite sides of the splice tray during assembly. The enclosure includes a base, a cover configured to be sealingly coupled with the base to form a housing, and a splice tray configured to be pivotally coupled with the base. The splice tray is configured to be pivoted between a first orientation relative to the base and a second orientation relative to the base. The splice tray is configured to form a larger angle relative to the base in the first orientation than in the second orientation, and the splice tray is configured to provide increased access to a front side of the splice tray and a rear side of the splice tray in the first orientation than in the second orientation.

26 Claims, 17 Drawing Sheets

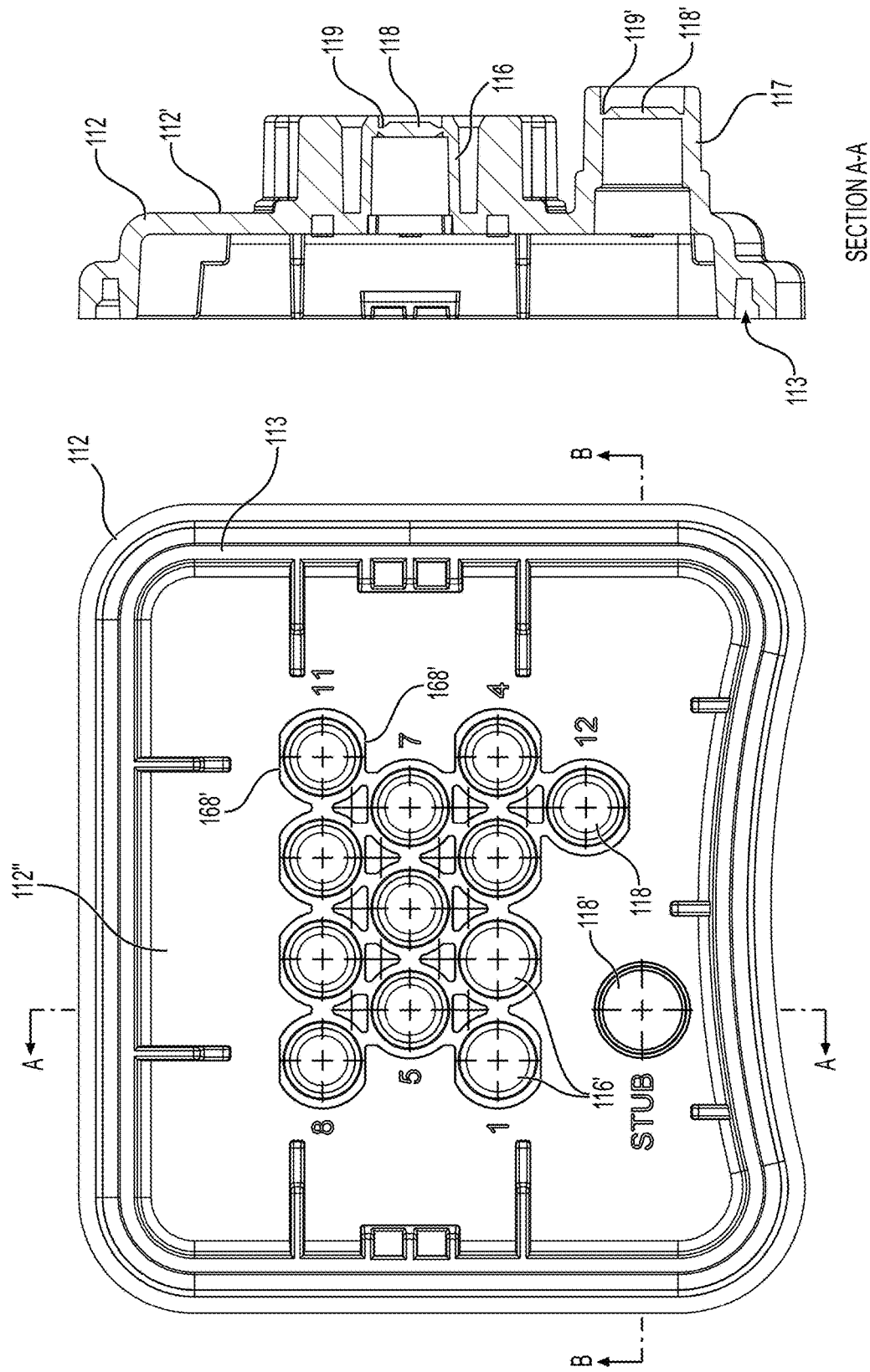

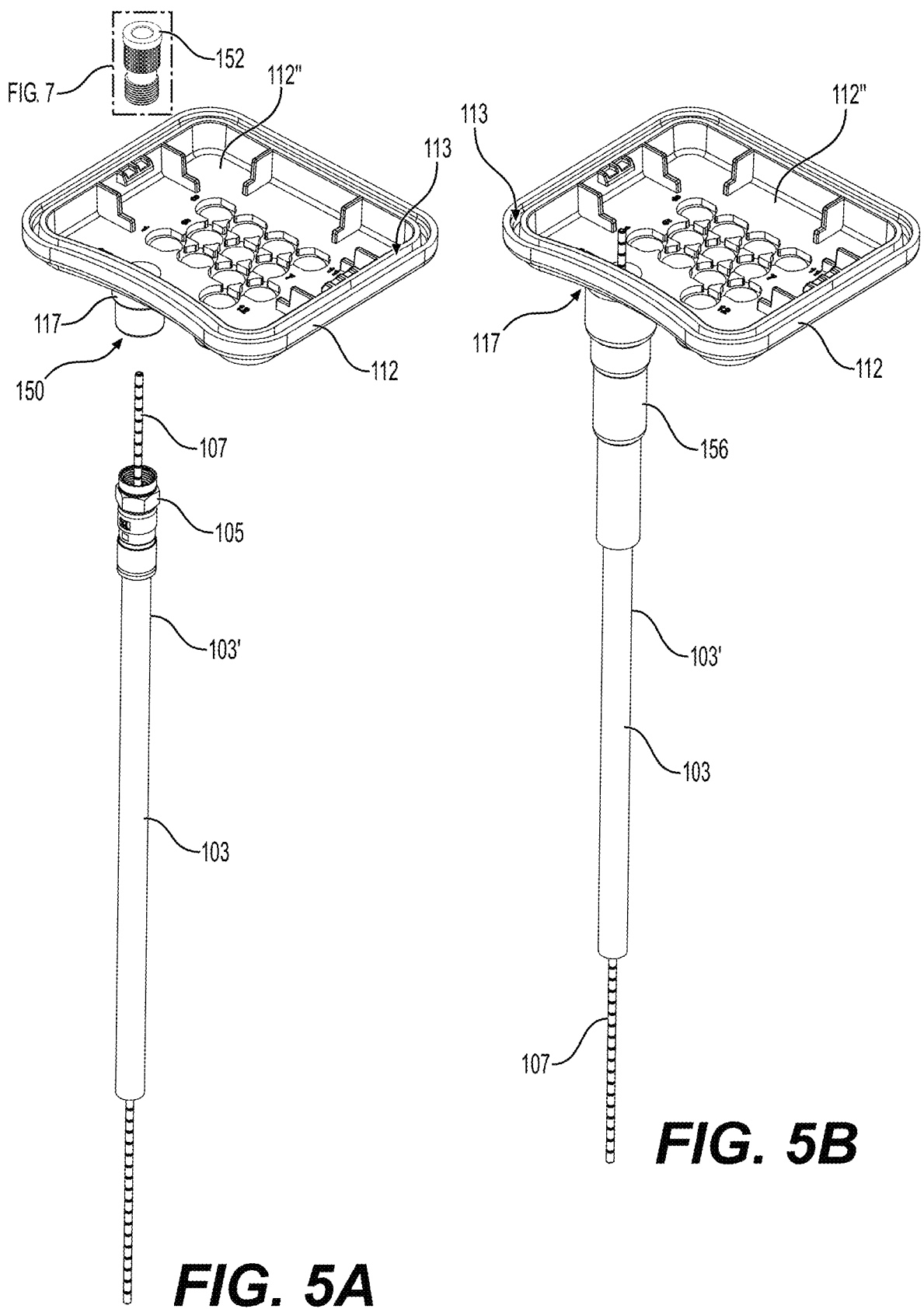

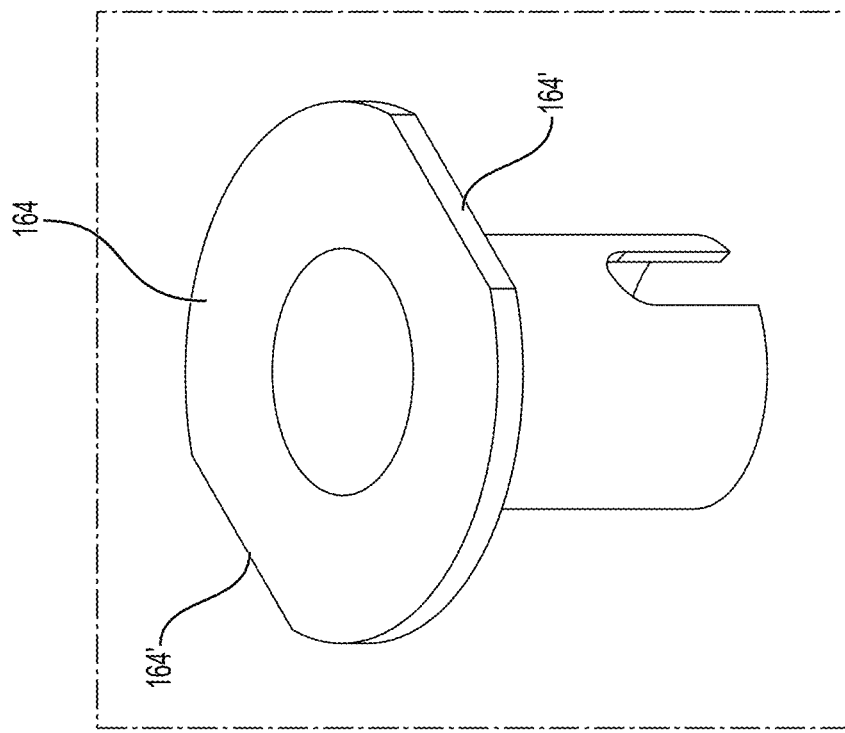
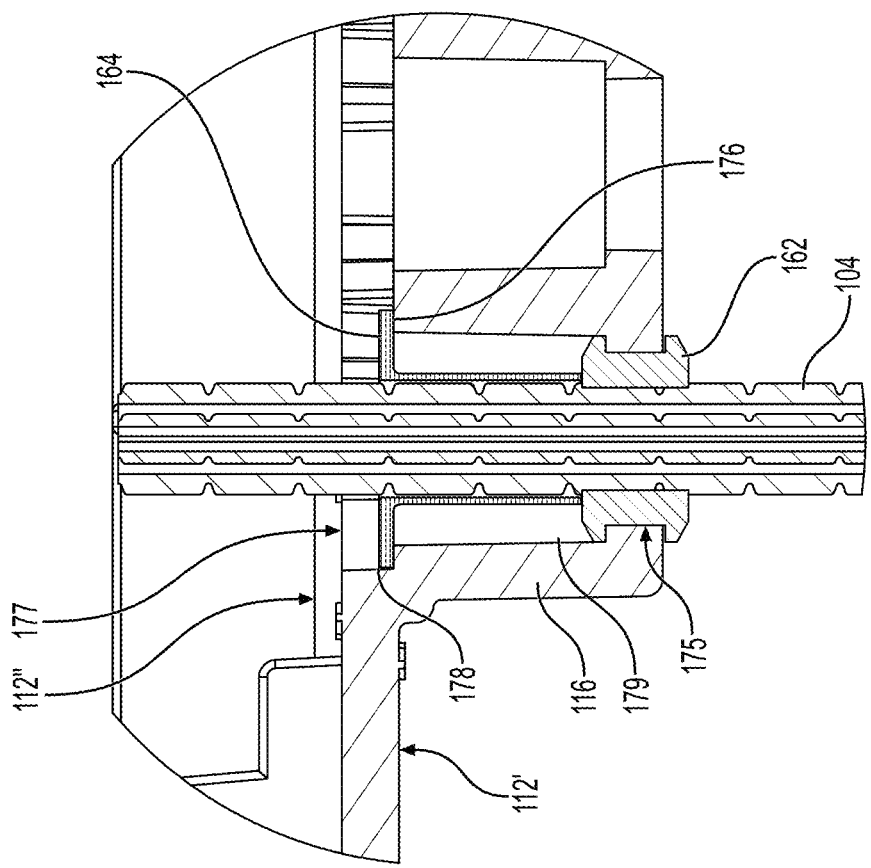
FIG. 9
FIG. 8D

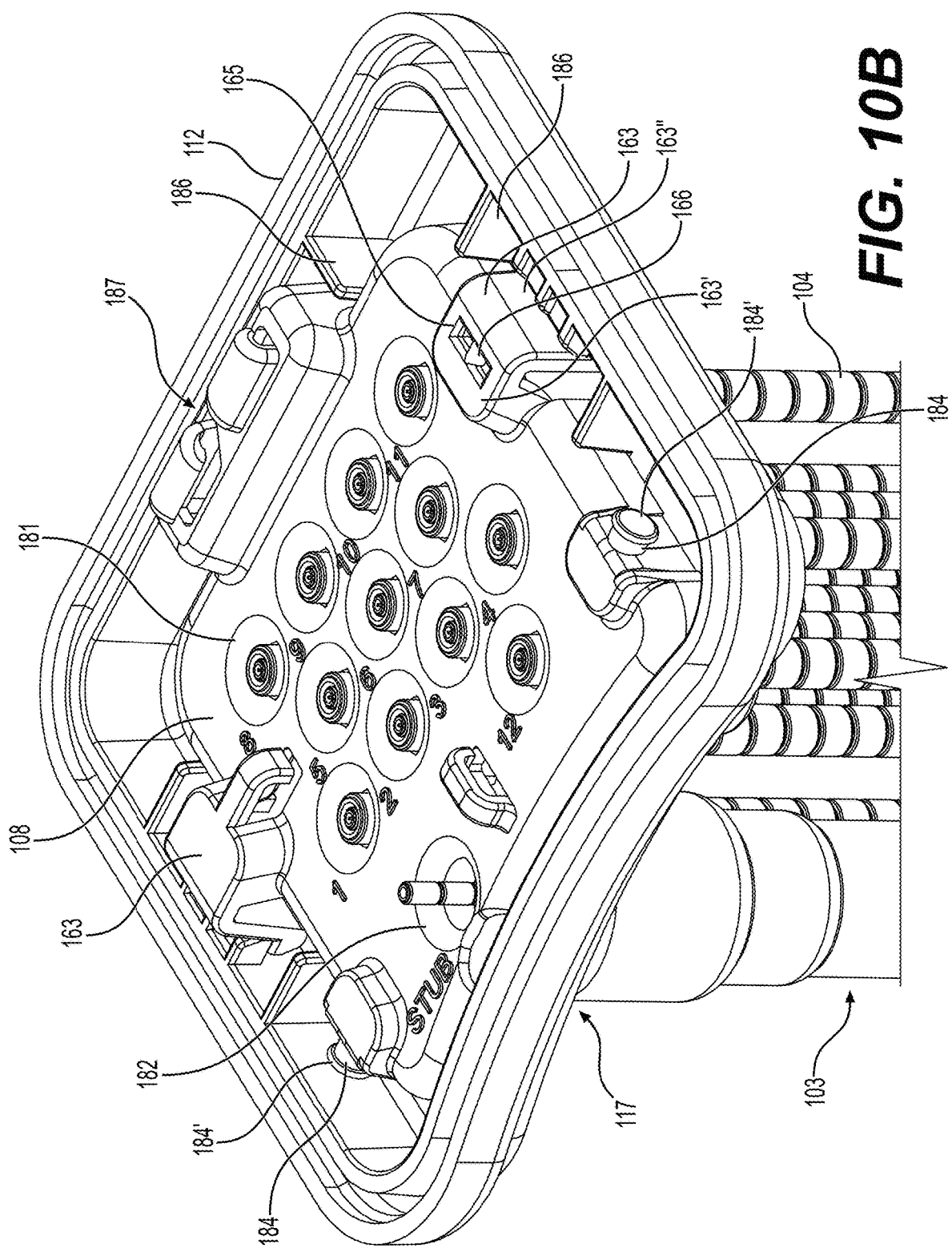

NETWORK ACCESS POINT (NAP) ENCLOSURES

CROSS REFERENCE TO RELATED APPLICATIONS

This application claims the benefit of U.S. Provisional Application No. 61/191,258, filed May 20, 2021, and U.S. Provisional Application No. 63/295,341, filed Dec. 30, 2021, the disclosures of which are hereby incorporated by reference herein in their entirety.

TECHNICAL FIELD

The present disclosure relates generally to telecommunications connection devices and, more particularly, network access point (NAP) enclosures for extending fiber optic service to end users.

BACKGROUND

Optical fiber systems are increasingly used in a variety of communications applications, including voice, video, and data transmissions, because they offer a high bandwidth for signal transmission, low noise operation, and inherent immunity to electromagnetic interference. Such systems typically require connections of optical fibers at various points in the network. For example, connection points are commonly needed to (i) connect individual optical fiber cable lengths to create a longer continuous optical fiber, (ii) create branching points that reroute fibers in the same cable in different directions as needed to provide fibers at desired locations, and (iii) connect active and passive components of the system.

One such connection point is a network access point (NAP). Conventional network access points include a rigid enclosure and have a predetermined fiber drop output angle. Such conventional network access points can cause difficulty for technicians with installation on a pole or in a pedestal/vault. Also, some conventional network access point enclosures utilize an epoxy potting assembly which is often a difficult process and make the enclosure a one-time use item.

It may be desirable to have network access point enclosures that are configured to receive a multi fiber optic cable input, for example, a cable with four to twelve fibers, and provide numerous outputs of flexible drop cables. It may be desirable to provide network access point enclosures that provide fiber management, splicing, breakout, and/or pass through capabilities in a compact assembly It may be desirable to have network access point enclosures that are configured to receive a distribution fiber cable (i.e., a multifiber cable) input, for example, a cable with four to twelve fibers, and provide a plurality of outputs of flexible fiber optic cables that extend from the enclosure and are terminated with an adapter configured to be coupled with a fiber optic connector of a drop cable. It may be desirable to provide network access point enclosures that provide environmental seals at the ports where the flexible fiber optic output cables exit the enclosure.

It may be desirable to provide a network access point enclosure including a splice tray that is configured to be pivotal between a first orientation relative to the base and a second orientation relative to the base, wherein the splice tray is configured to form a larger angle relative to the base in the first orientation than in the second orientation such that the splice tray is configured to provide increased access to a front side of the splice tray and a rear side of the splice tray in the first orientation relative to the second orientation. It may also be desirable to provide a splice tray that is configured to prevent a cover from being coupled with a base in the first orientation and to permit the cover to be sealingly coupled with the base in the second orientation.

SUMMARY

According to various exemplary aspects of the present disclosure, a network access point enclosure is configured to sealingly house a splice tray that is configured to pivot to provide increased access to opposite sides of the splice tray during assembly. The network access point enclosure includes a base, a cover configured to be sealingly coupled with the base to form a housing, a retainer configured to be coupled with the base, and a splice tray configured to be pivotally coupled with the retainer. The splice tray is configured to be pivoted between a first orientation relative to the base and a second orientation relative to the base, and the splice tray is configured to form a larger angle relative to the base in the first orientation than in the second orientation. The retainer includes a first engagement structure configured to receive a first portion of a support arm that extends from the splice tray to hold the splice tray in the first orientation and a second engagement structure configured to receive a second portion of a support arm to hold the splice tray in the second orientation. The base portion includes a plurality of ports configured to receive fiber optic cables. A coupling assembly is configured to couple each fiber optic cable with one of the plurality of ports such that fiber optic cable is rotatingly and slidingly fixed relative to the one port. The retainer is configured to be removed from the base when the cover is not attached to the base. The splice tray is configured to provide increased access to a front side of the splice tray and a rear side of the splice tray in the first orientation relative to the second orientation. The splice tray is configured to prevent the cover from being coupled with the base in the first orientation and to permit the cover to be sealingly coupled with the base in the second orientation.

In some embodiments, the cover is configured to be ultrasonically welded to the base.

According to various embodiments, a coupling assembly is configured to couple a fiber optic cable with one of the ports of the base, and the coupling assembly includes an adapter having a threaded interface port configured to receive a threaded coupler that is attached to and configured to rotate relative to the fiber optic cable.

In various embodiments, the fiber optic cable is configured to be sealingly coupled with the port with heat shrink.

According to some embodiments, at least one of the plurality of ports is configured to sealingly receive a drop cable.

In accordance with various exemplary aspects of the present disclosure, a network access point enclosure is configured to house a splice tray that is configured to pivot to provide increased access to opposite sides of the splice tray during assembly. The network access point enclosure includes a base, a cover configured to be sealingly coupled with the base to form a housing, a retainer configured to be coupled with the base, and a splice tray configured to be pivotally coupled with the retainer. The splice tray is configured to be pivoted between a first orientation relative to the base and a second orientation relative to the base and to form a larger angle relative to the base in the first orientation than in the second orientation. The base portion includes a plurality of ports configured to receive fiber optic cables, and each port is configured to couple with a fiber optic cable such that fiber optic cable is rotatingly and slidingly fixed relative to the one port. The splice tray is configured to provide increased access to a front side of the splice tray and a rear side of the splice tray in the first orientation than in the second orientation. The splice tray is configured to prevent the cover from being coupled with the base in the first orientation and to permit the cover to be sealingly coupled with the base in the second orientation.

In some embodiments, the retainer includes a first engagement structure configured to receive a first portion of a support arm that extends from the splice tray to hold the splice tray in the first orientation and a second engagement structure configured to receive a second portion of a support arm to hold the splice tray in the second orientation.

According to some embodiments, the retainer is configured to be removed from the base when the cover is not attached to the base.

In various embodiments, the cover is configured to be sealingly coupled with the base. For example, in some embodiments, the cover may be ultrasonically welded to the base.

According to various embodiments, the network access point enclosure further includes a coupling assembly configured to couple a fiber optic cable with one of the ports of the base, and the coupling assembly includes an adapter having a threaded interface port configured to receive a threaded coupler that is attached to and configured to rotate relative to the fiber optic cable.

In some embodiments, the fiber optic cable is configured to be sealingly coupled with the port with heat shrink.

In various embodiments, at least one of the plurality of ports is configured to sealingly receive a drop cable.

According to various aspects of the present disclosure, a network access point enclosure is configured to sealingly house a splice tray that is configured to pivot to provide increased access to opposite sides of the splice tray during assembly. The enclosure includes a base, a cover configured to be sealingly coupled with the base to form a housing, and a splice tray configured to be pivotally coupled with the base. The splice tray is configured to be pivoted between a first orientation relative to the base and a second orientation relative to the base. The splice tray is configured to form a larger angle relative to the base in the first orientation than in the second orientation, and the splice tray is configured to provide increased access to a front side of the splice tray and a rear side of the splice tray in the first orientation than in the second orientation.

In some embodiments, the splice tray is configured to prevent the cover from being coupled with the base in the first orientation and to permit the cover to be sealingly coupled with the base in the second orientation.

According to some embodiments, the network access point further includes a retainer configured to be coupled with the base. In some aspects, the retainer includes a first engagement structure configured to receive a first portion of a support arm that extends from the splice tray to hold the splice tray in the first orientation and a second engagement structure configured to receive a second portion of a support arm to hold the splice tray in the second orientation. According to various aspects, the retainer includes a third engagement structure configured to receive a portion of a second support arm that extends from the splice tray to hold the splice tray in the second orientation.

In various embodiments, the retainer is configured to be removed from the base when the cover is not attached to the base.

In some embodiments, the cover is configured to be sealingly coupled with the base. For example, in some embodiments, the cover may be ultrasonically welded to the base.

According to various aspects, the base portion includes a plurality of ports configured to receive fiber optic cables. In some aspects, each port is configured to couple with a fiber optic cable such that the fiber optic cable is rotatingly and slidingly fixed relative to the one port. According to various aspects, a coupling assembly is configured to couple a fiber optic cable with one of the ports of the base, and the coupling assembly includes an adapter having a threaded interface port configured to receive a threaded coupler that is attached to and configured to rotate relative to the fiber optic cable. According to some aspects, the fiber optic cable is configured to be sealingly coupled with the port with heat shrink.

In various aspects, at least one of the plurality of ports is configured to sealingly receive a drop cable.

BRIEF DESCRIPTION OF THE DRAWINGS

FIG. 4A is a top view of the base of the NAP enclosure of FIG. 1.

FIG. 4B is a cross-sectional view of the base of the NAP enclosure of FIG. 1.

FIGS. 5A and 5B are exploded and perspective views, respectively, of a fiber optic cable coupled with the base of the NAP enclosure of FIG. 1.

FIG. 8D is a cross-sectional view of the fiber optic cable coupled with the base of the NAP enclosure of FIGS. 8A-8C.

FIG. 9 is a perspective view of crimp ring for the fiber optic cable coupled with the base of the NAP enclosure of FIGS. 8A-8C.

FIGS. 10A-10C are exploded and perspective views, respectively, of a retainer coupled with the base of the NAP enclosure of FIG. 1.

DETAILED DESCRIPTION OF EMBODIMENTS

Figure 1:
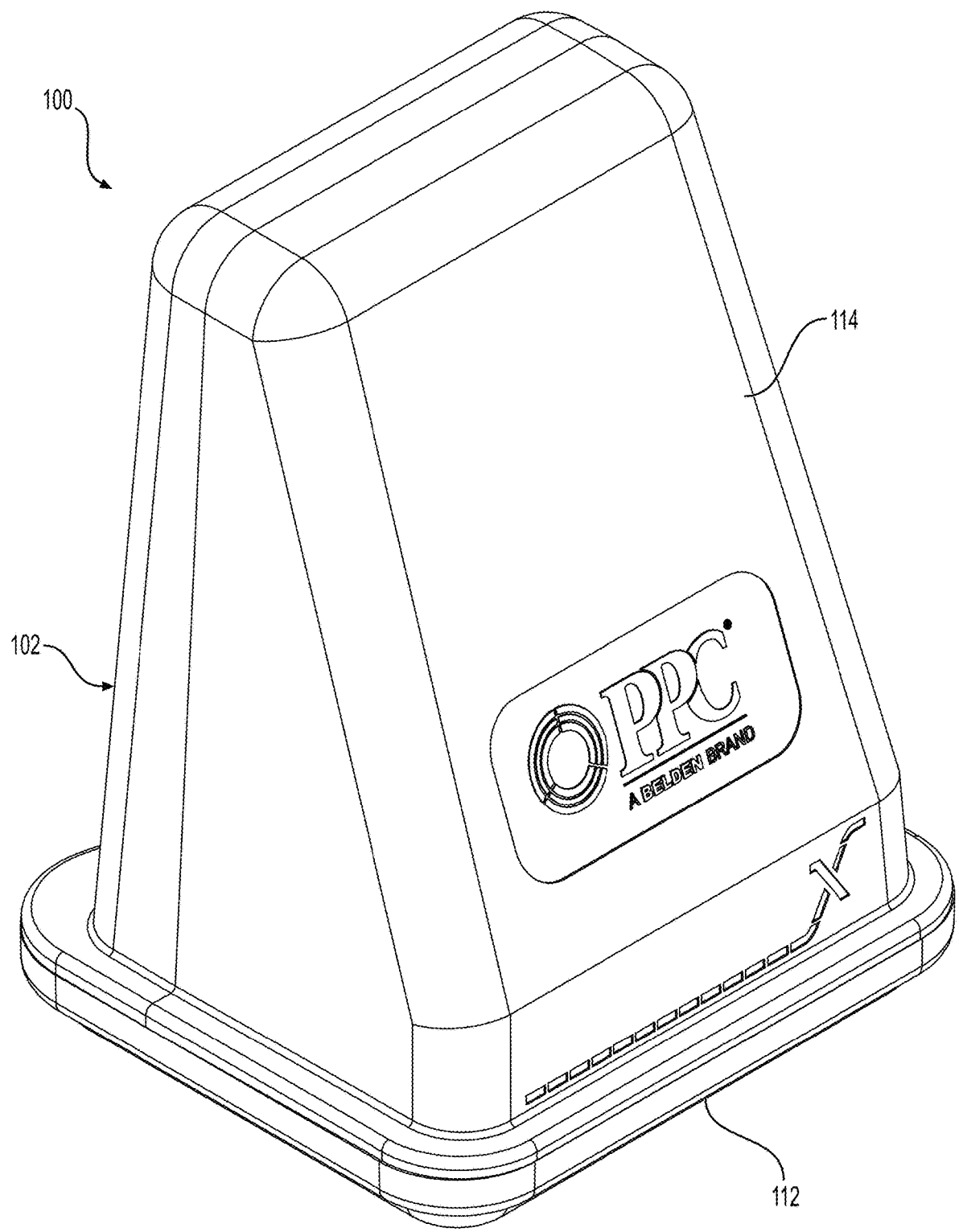
FIG. 1 is a first perspective view of an exemplary network access point (NAP) enclosure in accordance with various aspects of the disclosure.
Figure 2A:
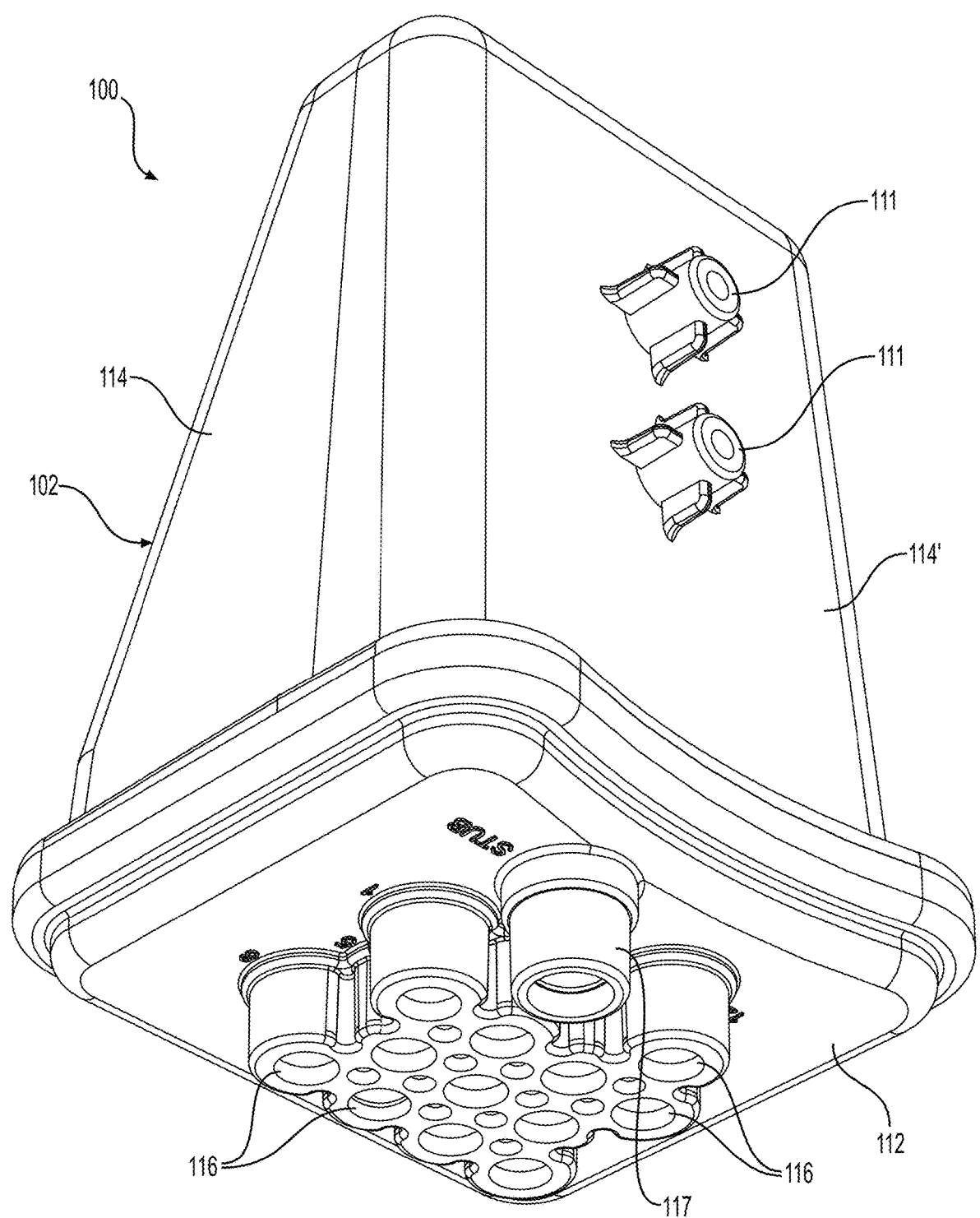
FIG. 2A is a second perspective view of the NAP enclosure of FIG. 1.
Figure 2B:
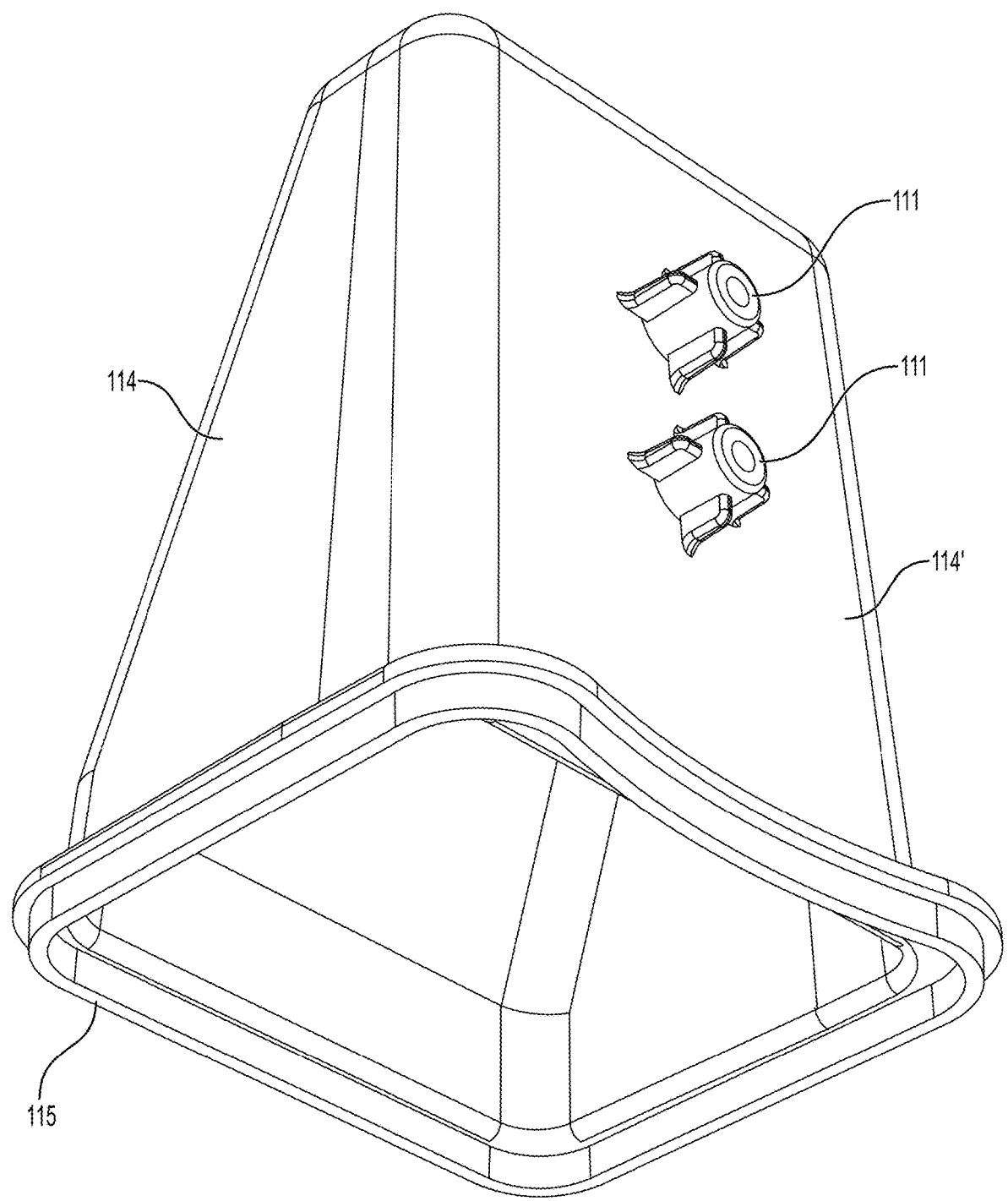
FIG. 2B is a perspective view of the cover of the NAP enclosure of FIG. 2.
Figure 3:
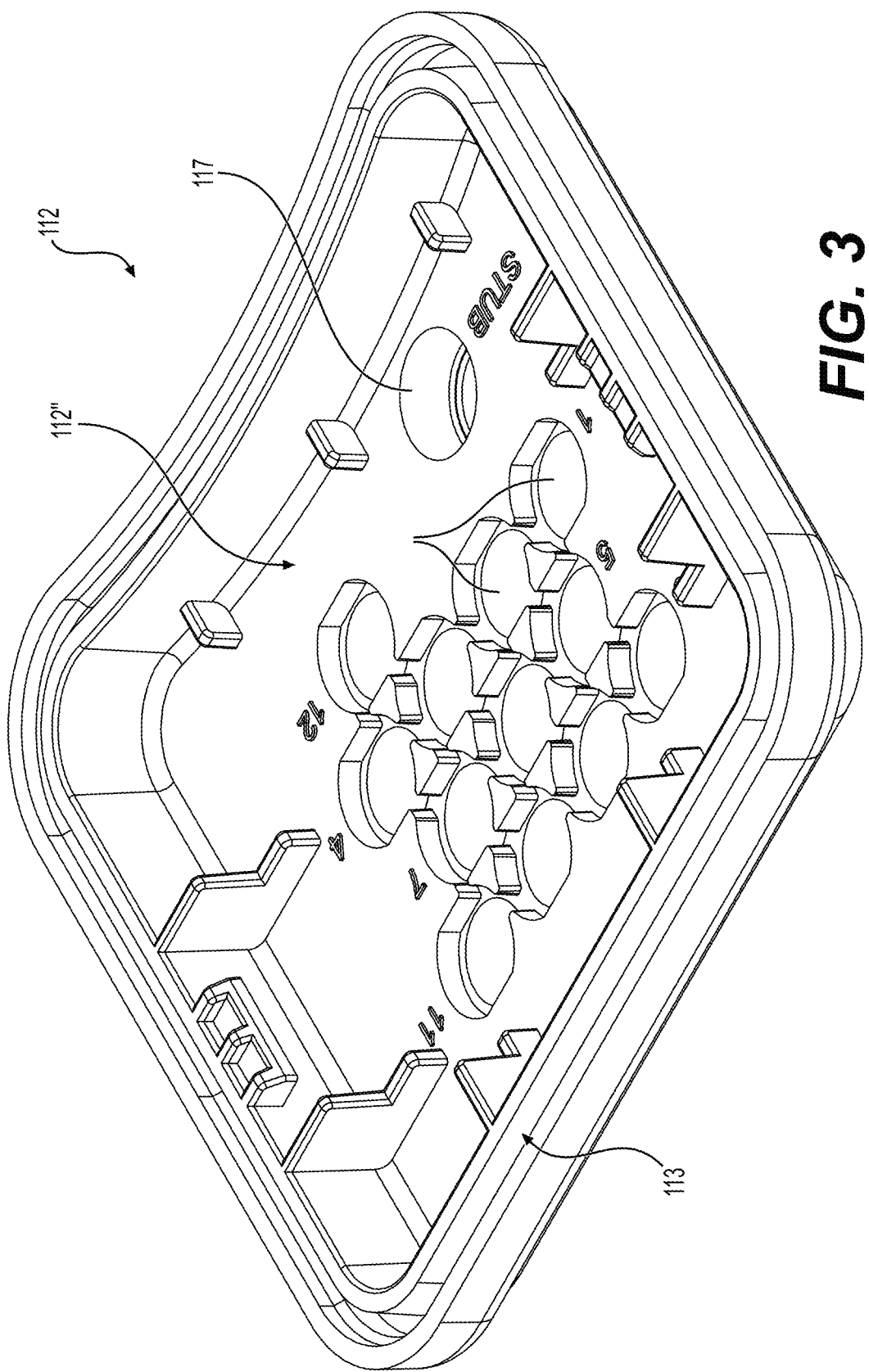
FIG. 3 is a perspective view of the base of the NAP enclosure of FIG. 1.

FIGS. 1-2A illustrate an exemplary network access point (NAP) enclosure 100 according to various aspects of the disclosure. The network access point enclosure 100 includes a housing 102, a splice tray 106 (FIG. 11), and a retainer 108

Figure 10A:
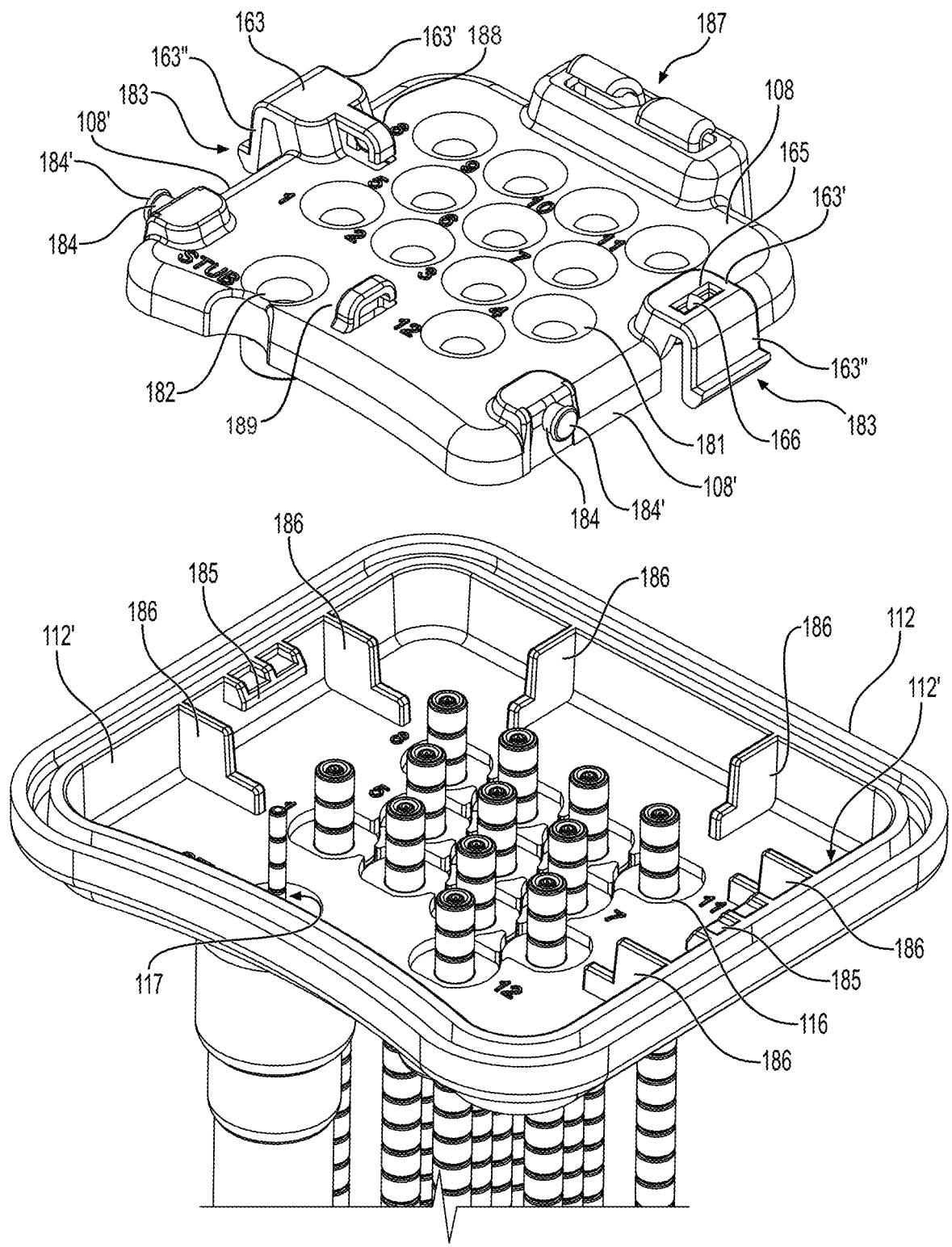

(FIG. 10A). The housing 102 includes a base 112 and a cover 114 configured to enclose the splice tray 106 and the retainer 108. The base 112 includes a peripheral groove 113 configured to receive a peripheral flange 115 of the cover 114. The base 112 and the cover 114 are configured to be coupled together to provide a housing. In some aspects, the base 112 and the cover 114 are configured to be sealingly coupled together to provide a weatherproof housing 102. For example, in some aspects, the base 112 and the cover 114 may be ultrasonically welded together at the flange 115 and groove 113 to provide an environmental seal, thereby providing a weatherproof housing that protects the interior of the housing 102 from external environment. Of course, the base 112 and the cover 114 may be sealingly coupled together by other means in order to provide a weatherproof housing 102. As shown in FIG. 2, a rear exterior wall 114' of the cover 114 includes projections 111 configured to facilitate mounting of the NAP enclosure 100 to a wall mount, a pole mount, a strand mount, etc. (not shown).

As illustrated in FIGS. 2A-4B, the base 112 may include a plurality of ports 116 configured to receive fiber optic cables 104 (e.g., drop cables) and one port 117 configured to receive a fiber optic cable 103 (e.g., an aerial drop cable or a duct). The ports 116 may extend from a bottom surface 112' of the base 112, as shown in FIG. 2. In the illustrated embodiment, the base 112 includes twelve ports 116 configured to receive drop cables. Two ports 116' of the plurality of ports 116 may be manufactured as open ports, while the remaining ten ports 116 may be manufactured as a closed port including a punchout portion 118 that has a weakened portion 119 about its periphery to facilitate punching out of the punchout portion 118 depending on the desired cabling configuration employed in the enclosure 100. Similarly, the port 117 may be manufactured as a closed port including a punchout portion 118' that has a weakened portion 119' about its periphery to facilitate punching out of the punchout portion 118' depending on the desired cabling configuration. The drop cables may comprise any drop cable including, for example, a Miniflex® fiber cable or any ungrooved fiber cable. The port 117 is labeled "STUB" in FIGS. 2 and 3.

Referring now to FIGS. 5A-7, a coupling assembly 150 is configured to couple the cable 103 to the port 117 of the base 112 of the housing 110. As illustrated, the cable 103 may comprise a single fiber cable, such as, for example, PPC's Aerial All Dielectric Self Supporting (ADSS) fiber cable. The cable 103 may alternatively comprise a multifiber cable or a duct containing a single fiber cable or a multifiber cable, as long as the cable is configured to be terminated with a nut, as described below. In the illustrated embodiment, the cable 103 has a jacket 103' that is terminated with a nut 105 configured to rotate relative to the jacket 103' and a fiber cable 107 in the jacket 103'. The fibers 107 of the cable 103 are configured to extend through the nut 105 and the port 117 of the base 112 and into the housing 110 where they can be optically coupled with a splitter, a tap, or another fiber, depending on the desired configuration of the NAP enclosure 100.

In its assembled configuration, the NAP enclosure 100 may include at least one input fiber cable and at least one output fiber cable, but the NAP enclosure 100 will typically include one input fiber cable and a plurality of output fiber cables. The input fiber cable may comprise fiber 103 or one of the fibers 104, and the output fibers comprise two or more of the fibers 104.

Figure 6A:
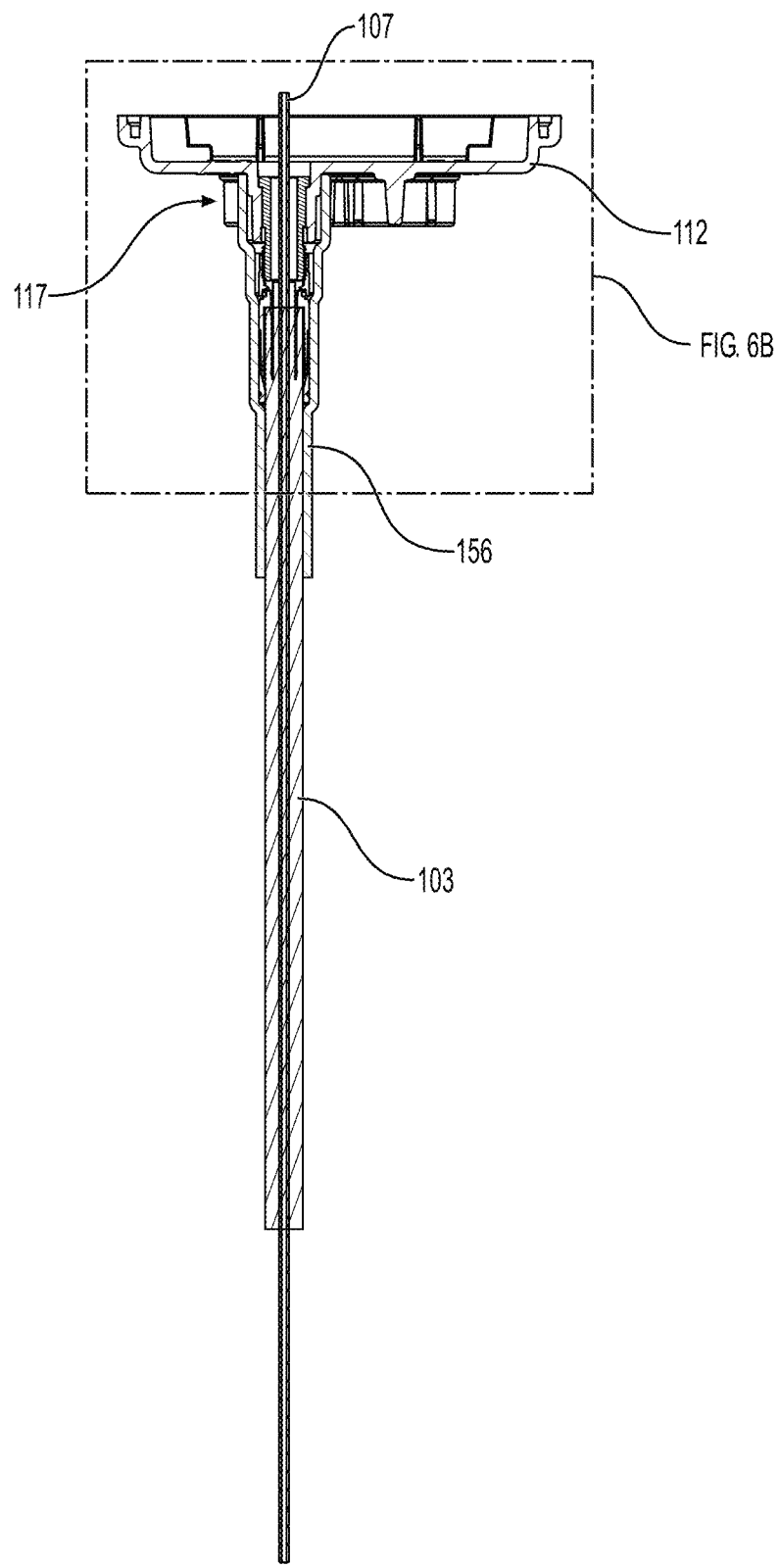
FIGS. 6A and 6B are cross-sectional view of the fiber optic cable coupled with the base of FIGS. 5A and 5B.
Figure 6B:
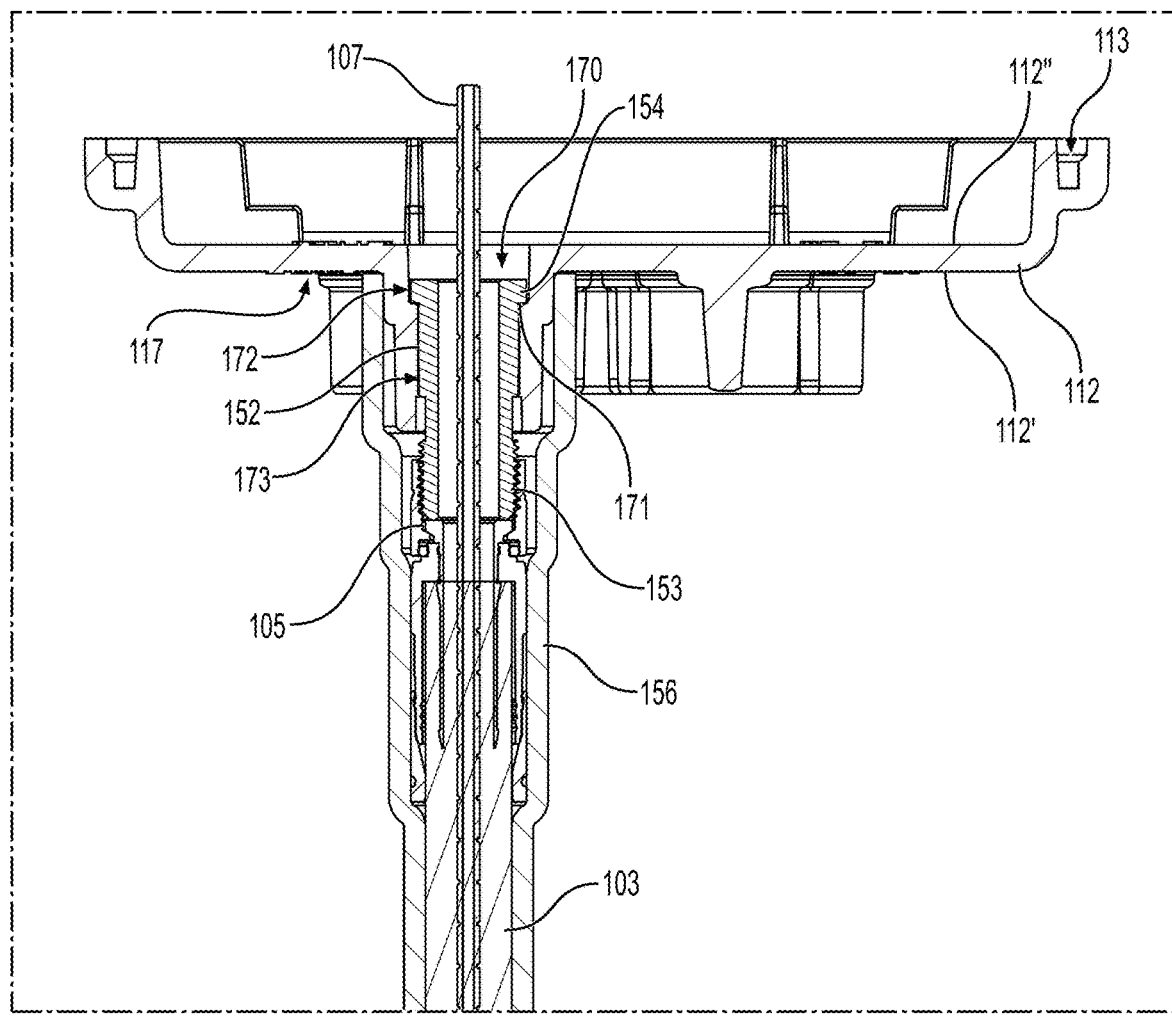
Figure 7:
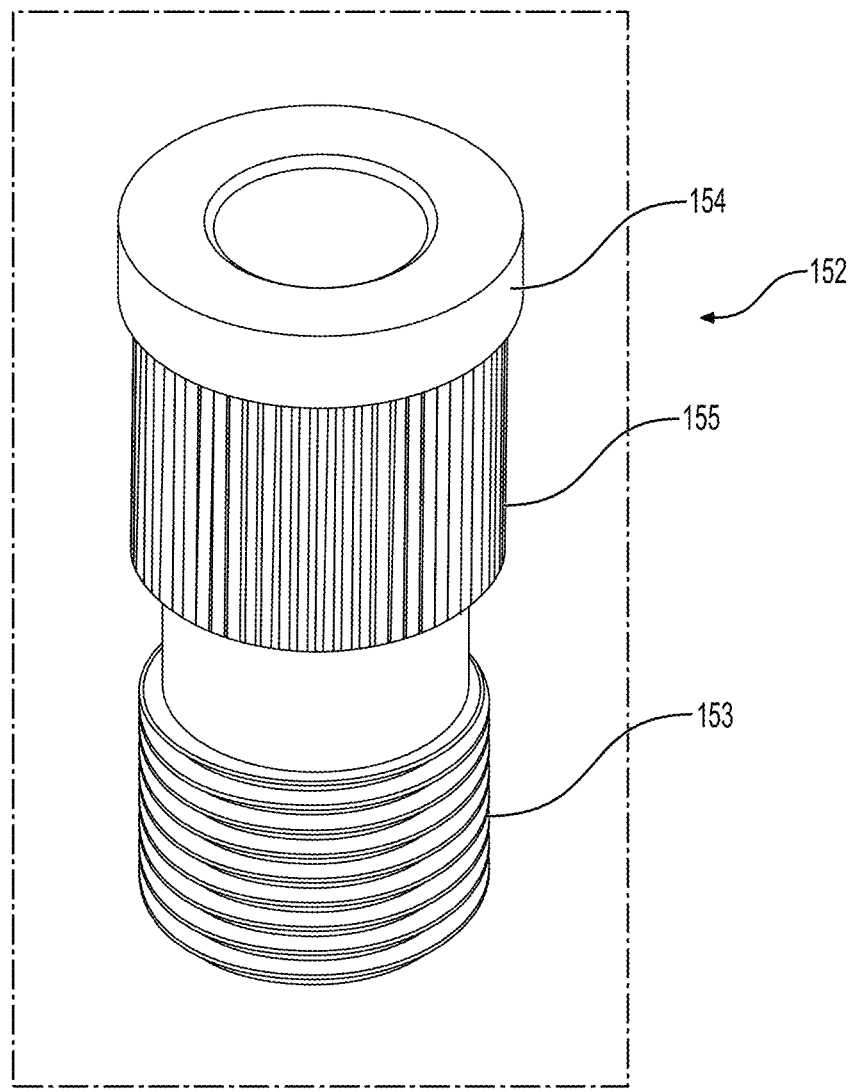
FIG. 7 is a perspective view of an adapter of the coupling assembly for the fiber optic cable coupled with the base of FIGS. 5A and 5B.

The coupling assembly 150 includes a port adapter 152, as illustrated in FIG. 7, configured to be inserted into the port 117 to provide strain relief between the cable 103 and the base 102. After the punchout portion 118' is removed, for example, by punching in a direction from a top surface 112" of the base 112 toward the bottom surface 112', the port adapter 152 is inserted into a through bore 170 of the port 117 from the top surface 112". The port adapter 152 includes a threaded portion 153 at a first end and a flange portion 154 at an opposite second end Between the threaded portion 153 and the flange portion 154, the port adapter 152 includes a ribbed portion 155 having longitudinal ribs on an outer surface of the port adapter 153. As best illustrated in FIG. 6B, when inserted into the port 117, the flange portion 154 rests against a shoulder 171 formed in the through bore 170 at a stepped transition from a wider through bore portion 172 to a narrower through bore portion 173. The ribbed portion 155 is received in the narrower through bore portion 173 and may be heat staked or ultrasonically welded to the port 117 to increase torsional strength of the connection.

The threaded portion 153 comprises an F81 interface port configured to threadedly receive the nut 105 of the cable 103. After the nut 105 is threadedly coupled with the threaded portion 153 to a tightened configuration, a heat shrink tubing 156 can be placed over the cable 103, the nut 105, and the port 117 and hermetically sealed at both ends to waterproof the connection between the cable 103 and the port 117.

Figure 8C:
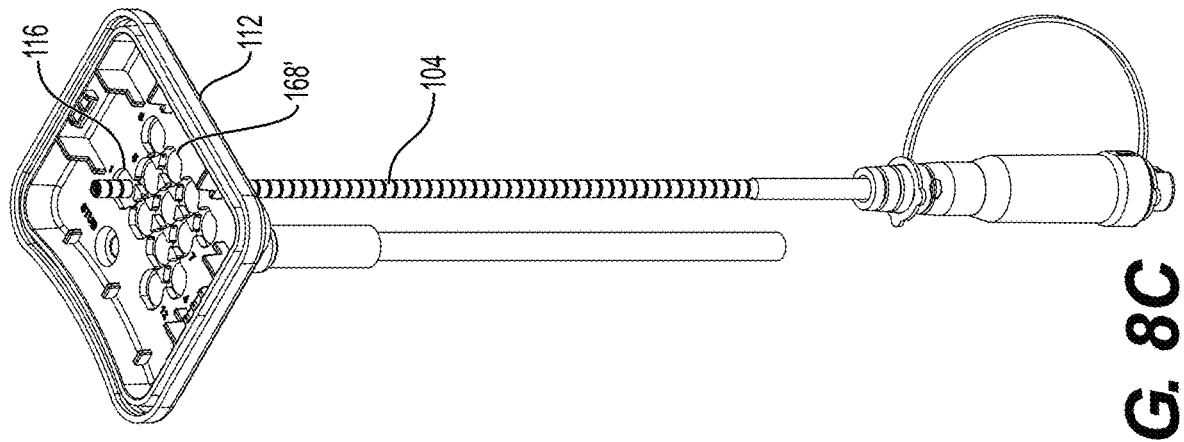
FIGS. 8A-8C are exploded and perspective views, respectively, of another fiber optic cable coupled with the base of the NAP enclosure of FIG. 1.
Figure 8B:
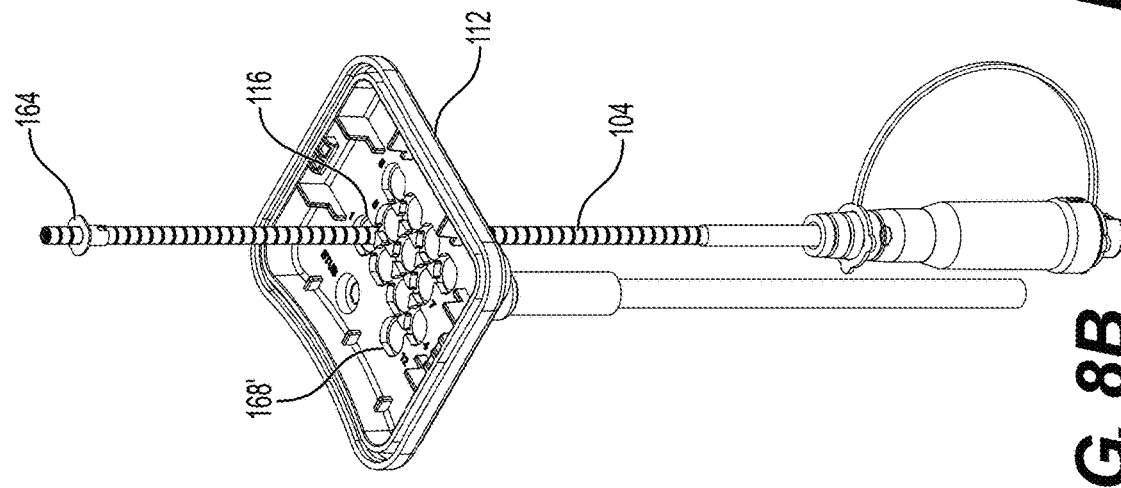
Figure 8A:
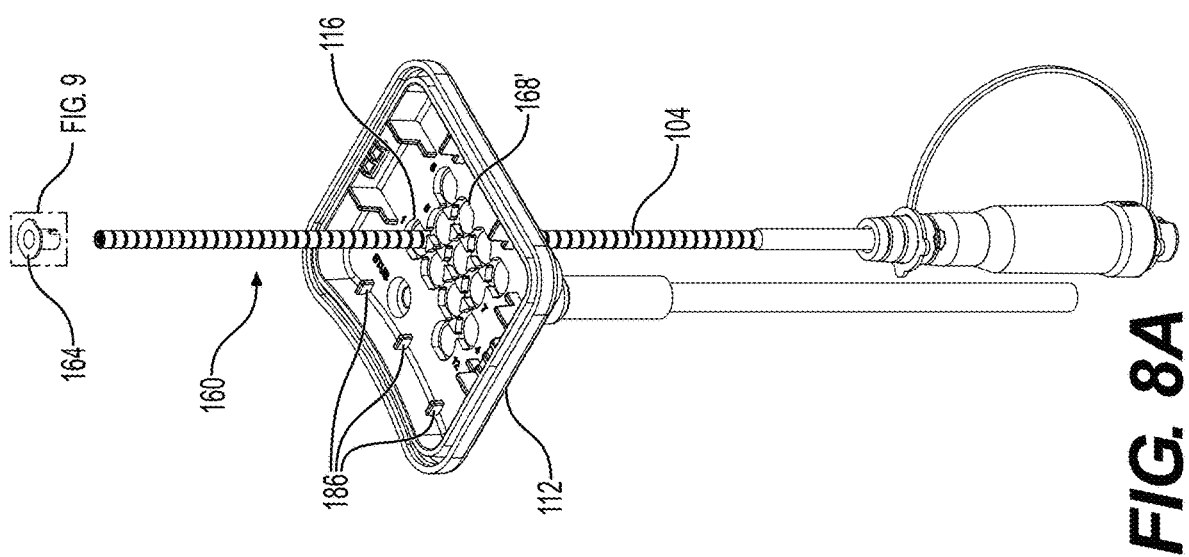

Referring now to FIGS. 8A-9, a coupling assembly 160 is configured to couple a drop cable 104 to one of the ports 116 of the base 112 of the housing 110. As illustrated, the drop cable 104 comprises PPC's Miniflex® fiber cable; however, it should be understood that the drop cable 104 may be any fiber cable. The assembly 160 includes a grommet 162 and a crimp sleeve 164. The grommet is configured to be received in an opening 175 of the port 116. The grommet 162 is configured such that the drop cable 104 can be fed through the grommet 162 from the bottom surface 112' of the base 112, as shown in FIG. 8A. As shown in FIG. 8B, after the cable 104 is fed through the grommet 162, the crimp sleeve 164 is crimped on a jacket 104' of the cable 104 at a distance from the end of the jacket 104'. Although not illustrated to avoid confusion, in some exemplary embodiments, a bare fiber (not shown) of the cable 104 may extend 20 inches or more, for example, three feet, beyond the end of the jacket 104' to provide sufficient slack to store and splice the fiber within the housing 110.

After the crimp sleeve 164 is crimped onto the jacket 104', the drop cable 104 is pulled back out of housing 110 from the bottom surface 112' until the crimp sleeve 164 is seated against a shoulder 176 formed in a through bore 177 of the port 116 at a stepped transition from a wider through bore portion 178 to a narrower through bore portion 179, as shown in FIGS. 8C and 8D. The wider through bore portion 178 includes at least one flat region 178' configured to receive a flat portion 164' of the crimp sleeve 164 (FIG. 9). In the illustrated embodiment, the wider through bore portion 178 includes two opposing flat regions 178' configured to receive two opposing flat portions 164' of the crimp sleeve 164. The crimp sleeve 164 thus provides tension and torsion strain relief between the cable 104 and the base 112.

Figure 10C:
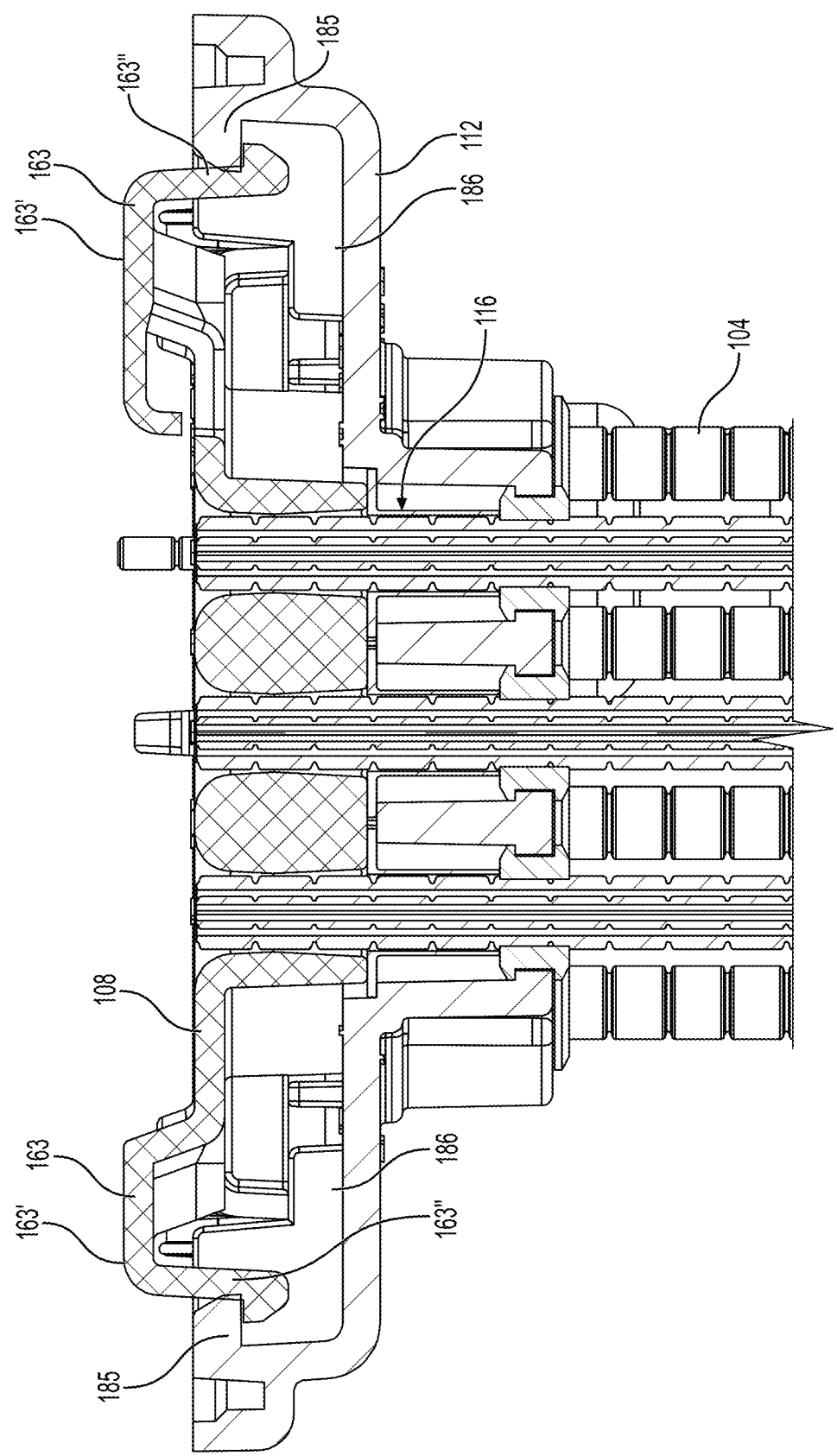

Referring now to FIGS. 10A-10C, the NAP enclosure 100 includes a retainer 108 configured to be coupled with the base 112 to maintain the position of the fiber cables 103, 104 that extend through the ports 116, 117 into the housing 102. The retainer 108 includes openings 181 configured to be aligned with the ports 116 and an opening 182 configured to be aligned with the port 117. The openings 181 and the opening 182 include tapered and/or curved entrances to prevent the bare fibers from being bent beyond a minimum bend radius when entering the enclosure. The retainer 108 includes latches 183 extending outward from opposite sides 108' of the retainer 108. The latches 183 are configured to be coupled with catches 185 on the base, as described below. The retainer 108 also includes projections 184 extending outward from the opposite sides 108' of the retainer and having an enlarged flanged free end 184'. Although the illustrated embodiment includes the latches 183 and projections 184 extending from the same opposite sides 108', it should be understood that the latches 183 and projections 184 may extend from other and/or different opposite sides of the retainer 108. The retainer 108 may include cable guides 188, 189, as best shown in FIGS. 10A and 10B, to assist with cable routing and management.

The base 112 includes catches 185 extending inward from opposite walls 112' to an interior of the base 112. The catches 185 are configured to receive the latches 183 to secure the retainer 108 to the base 112, as shown in FIG. 10C. Referring to FIG. 10A, the base 112 may also include structures 186 extending inward from the walls and upward from the top surface 112" of the base 112 to the interior of the base 112. The structures 186 help to position the retainer 108 relative to the base 102 when coupling the retainer 108 with the base 102. The structures 186 may also support the walls of the retainer 108 when coupled with the base 102.

The retainer 108 eliminates the need for potting the cables in the base 112. The retainer 108 thus saves the mess of potting and the permanency of the potting. For example, once the cables are potted, the cables cannot be rearranged relative to the base. However, with the retainer 108, the cables can be rearranged by unlatching the latches 183 from the catches 185 to free the retainer 108 from the base 112.

The retainer 108 may also include a hinge receiver 187, and the splice tray 106 (FIG. 11) may include a hinge 130 configured to be pivotally received by the hinge receiver 187. With the retainer 108 latched to the base 112, the hinge 130 and hinge receiver 187 are configured to permit the splice tray 106 to pivot from a position beyond perpendicular relative to the base 112, as shown in FIGS. 12A-12D, to a position at an acute angle relative to the base 112 and within the periphery of the base 112, as shown in FIGS. 12E-12I. The splice tray 106 includes a front side 106*a* and a back side 106*b*. The splice tray 106 also includes projections 169 extending outward from opposite side walls 106*c*, 106*d* of the splice tray 106 and having an enlarged flanged free end 169'.

Figure 11:
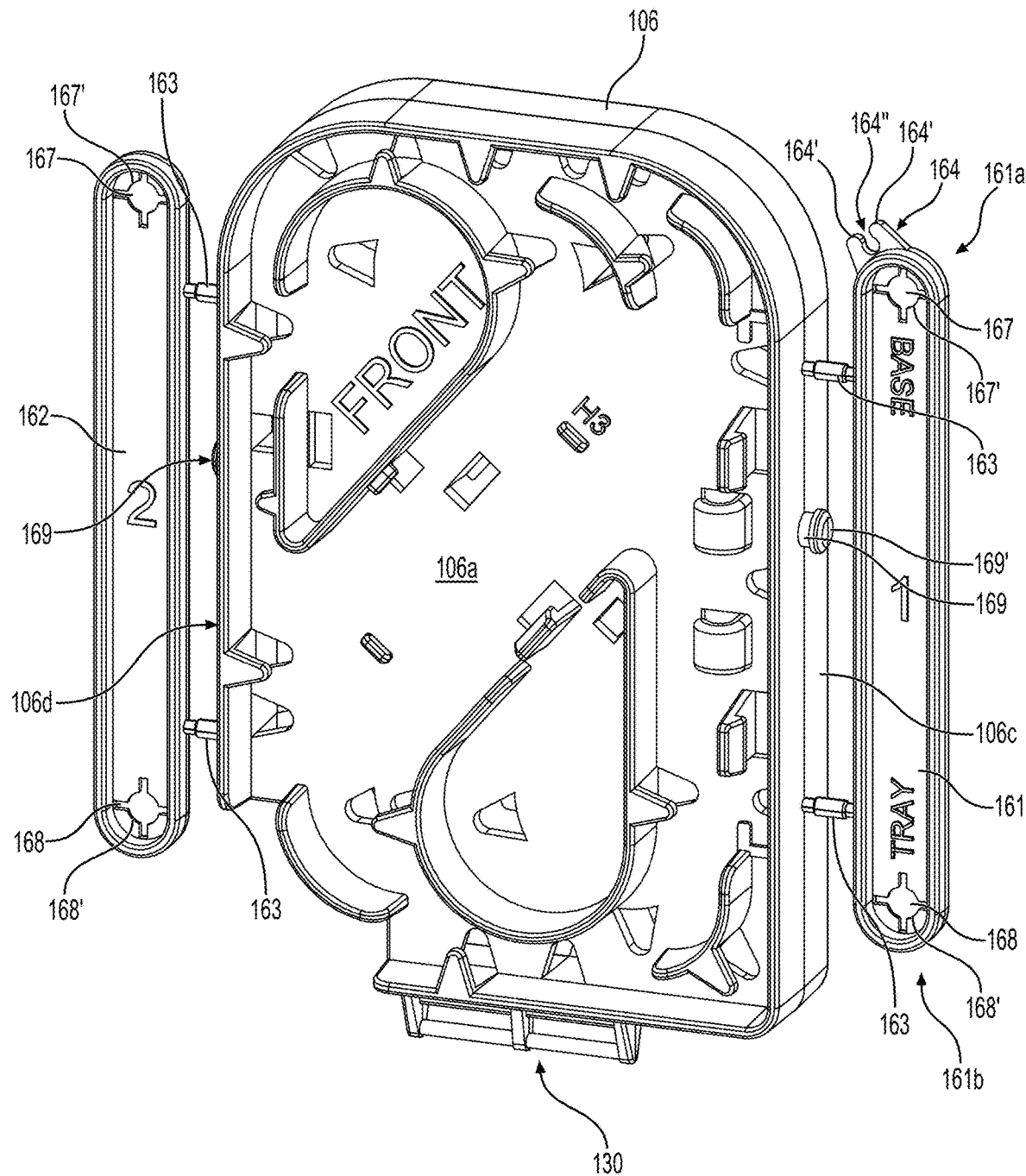
FIG. 11 is a perspective view of a splice tray for use with the NAP enclosure of FIG. 1.
Figure 12A:
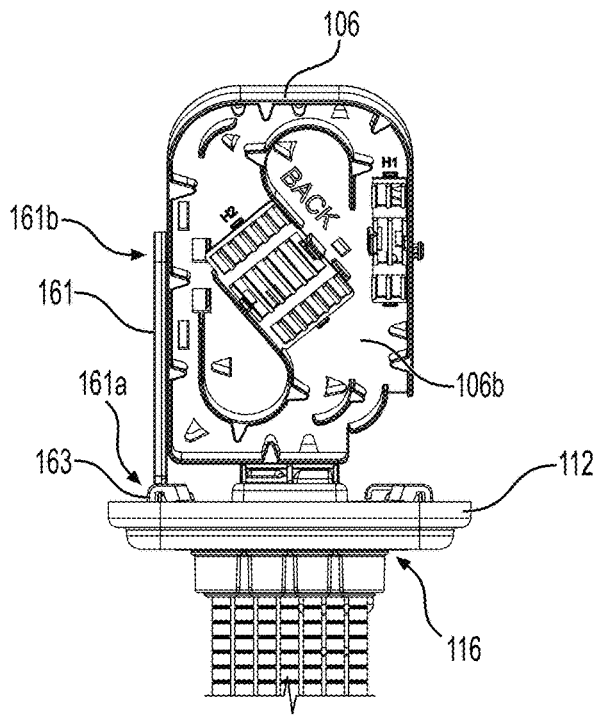
FIGS. 12A-12I are front and perspective view of various configurations of the splice tray of FIG. 11 coupled with the retainer and base of FIGS. 10A-10C.
Figure 12B:
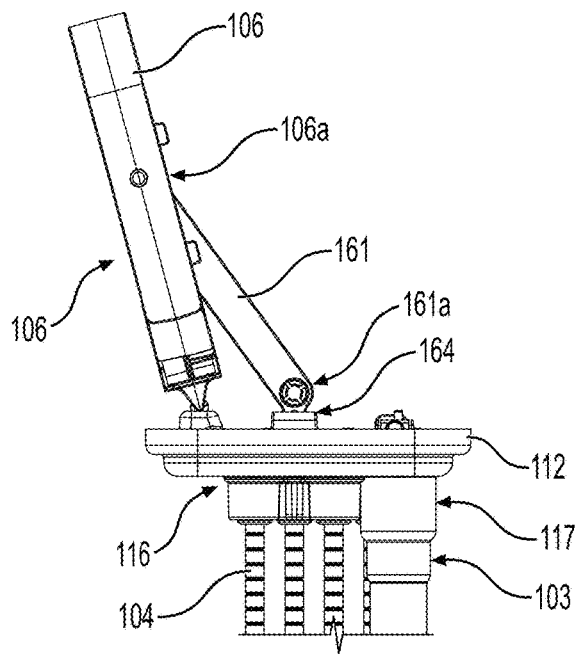
Figure 12C:
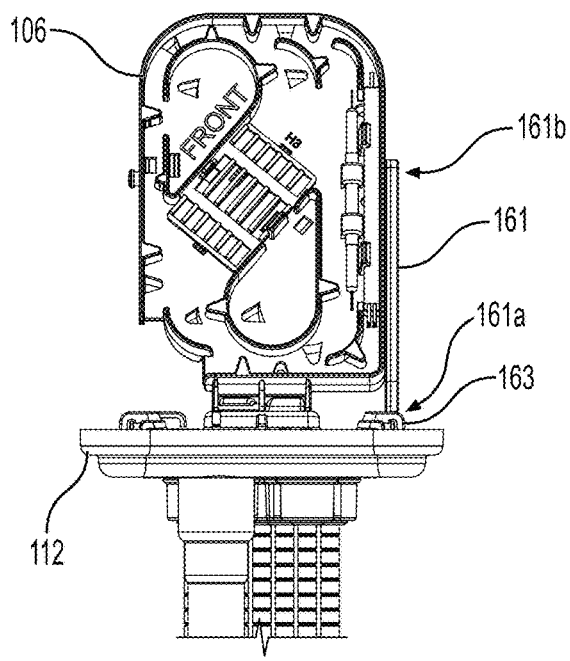
Figure 12D:
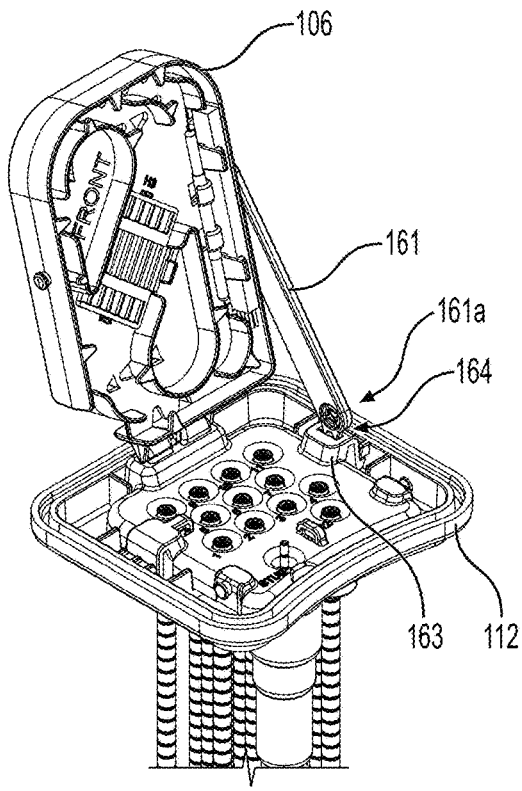
Figure 12E:
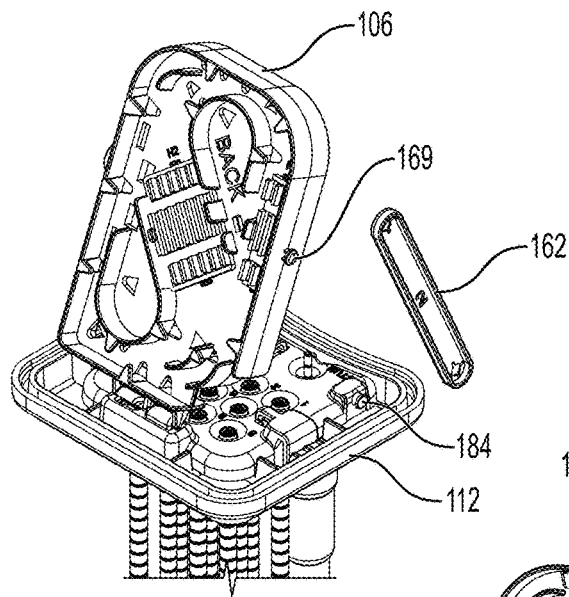
Figure 12F:
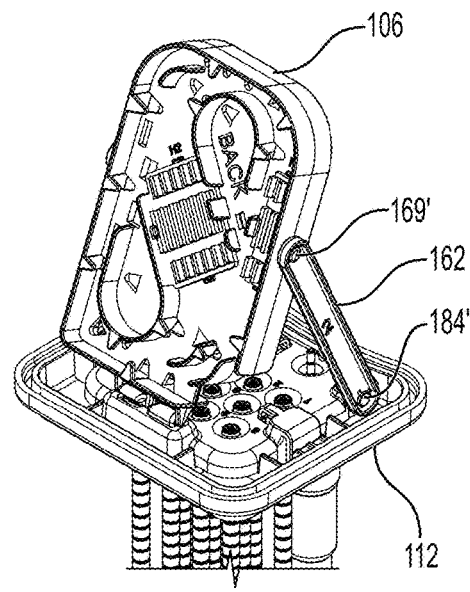
Figure 12G:
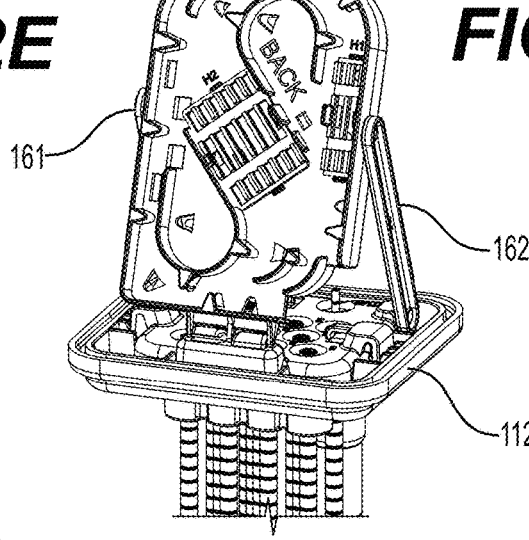
Figure 12H:
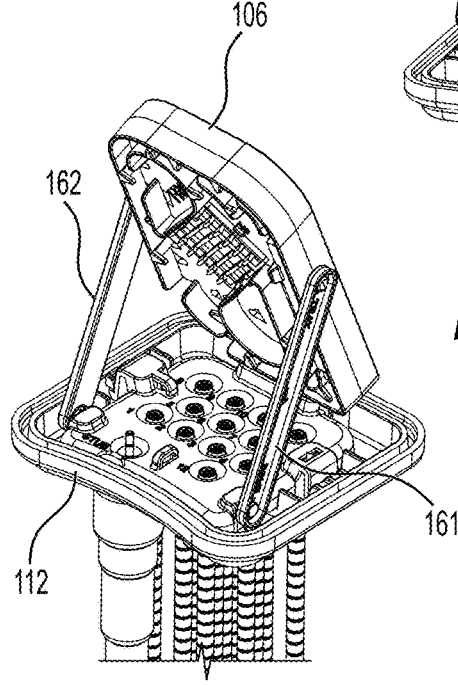
Figure 12I:
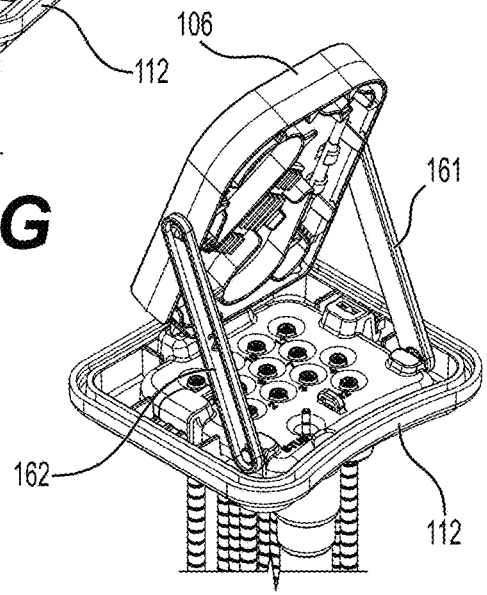

Referring to FIG. 11, the splice tray 106 may be manufactured with one or more support arms 161, 162 removably attached thereto. For example, as illustrated, the support arms 161, 162 may be attached to the splice tray 106 by runner segments 163. The runner segments 163 can be clipped off the splice tray 106 and the support arms 161, 162 to separate the support arms 161, 162 from the splice tray 106. The splice tray may include various cable guides to assist with cable routing and management.

The first support arm 161 includes a first end 161*a* and an opposite second end 161*b*. The first end 161*a* includes a first positioning member 164 extending from therefrom. The first positioning member 164 comprises two spaced apart fingers 164' defining an opening 164". The opening 164" narrows at the free end of the fingers 164', and the fingers 164' are sufficiently flexible to permit a second positioning member that is larger than the narrowed portion of the opening 164" to be inserted through the narrowed portion by urging the fingers 164' apart. The first support arm 161 includes a through hole 167 proximate the first end 161*a* and a through hole 168 proximate the second end 161*b*. The through holes 167, 168 are defined by flaps 167', 168' are sufficiently flexible such that the flaps 167', 168' are configured to be urged radially outward relative to the through hole 167, 168 by the enlarged flanged free end 184' of one of the projections 184 or by the enlarged flanged free end 169' of one of the projections 169 as the respective projection is inserted through the through hole 167, 168. The flaps 167', 168' are configured to return to their rest configuration after the enlarged flanged free end 184' or 169' passes through the through hole 167, 168 to prevent undesired removal of the arm 161 from the projection 184 or 169. The second support arm 162 similarly includes through holes 167, 168 defined by flaps 167', 168', but may not include the first positioning member.

Referring again to FIGS. 10A and 10B, each of the latches 163 includes a plateau portion 163' and a finger portion 163" configured to be sufficiently flexible to permit the finger portion 163" to flex inward when being coupled with the catch 185, as would be understood by persons skilled in the art. The plateau portion 163' of a first one 163*a* of the latches includes a slot 165 configured to receive the 164' of the first positioning member 164. The second positioning member 166 is disposed in the slot 165. The second positioning member 166 may comprise a pin that extends perpendicular to an elongated dimension of the slot 165 such the first positioning member 164 is configured to receive the second positioning member 166 in the opening 164" when the fingers 164' are inserted into the slot 165.

Referring again to FIGS. 12A-12D, in order to facilitate assembly of the NAP enclosure, the splice tray 106 may be oriented approximately perpendicular to the base 112. To hold the splice tray 106 in the first orientation relative to the base 112 as illustrated in FIGS. 12A-12D, the projection 169 from one side wall 106*c* of the splice tray 106 is inserted through the through hole 168 proximate the second end 161*b* of the first support arm 161, and the positioning member 164 of the first support arm 161 is inserted into the slot 165 until the second position member is inserted into the opening 164" of the first support arm 161. After the second positioning member 166 is inserted through the narrowed portion of the opening 164", the fingers 164' return toward their rest position to maintain the second positioning member 166 in the opening 164" and prevent undesired removal of the first positioning member 164 from the second positioning member 166. Thus, the first positioning member 164 and the second positioning member 166 are configured to hold the splice tray 106 in the first orientation relative to the base 112 as shown in FIGS. 12A-12D. In the first orientation, the front side 106*a* and the back side 106*b* are most accessible for assembly. That is, in the first orientation, slack length of the fiber cables 103, 104 can be routed around and/or through various fiber guides on the front side 106*a* and/or the back side 106*b* of the splice tray 106; the bare fibers of the fiber cables 103, 104 can be spliced or otherwise optically coupled with a splitter, a tap, or the like; and a splitter, tap, splice sleeve holder, or the like can be attached the front side 106*a* or the back side 106*b* of the splice tray 106.

After assembly of the desired optical fiber configuration for the NAP enclosure 100 is complete, the first positioning member 164 can be removed from the second positioning member 166, and the splice tray 106 can be repositioned to a second orientation, as illustrated in FIGS. 12E-12I. In the second orientation, the splice tray 106 is inclined at an acute angle relative to the base 112 such that the cover 114 can be coupled with the base 112 to provide a more compact NAP enclosure 100 than if the splice tray 106 were left in the first orientation. The projection 169 from the one side wall 106c of the splice tray 106 can remain inserted through the through hole 168 proximate the second end 161b of the first support arm 161 as the splice tray 106 is pivoted to the second orientation. In the second orientation, the projection 184 extending outward from a side 108' of the retainer 108 adjacent to the first support arm 161 is inserted through the through hole 167 proximate the first end 161a.

Although the first support arm 161 may be adequate to maintain the splice tray 106 in the second orientation relative to the base 112, it some aspects, the second support arm 162 may be coupled to the base 112 and the splice tray 106 for additional support. For example, the projection 169 from the one side wall 106d of the splice tray 106 is inserted through one of the through holes 167, 168 of the second support arm 162, and the projection 184 extending outward from a side 108' of the retainer 108 adjacent to the second support arm 162 is inserted through the other one of the through holes 167, 168 of the second support arm 162.

It should be appreciated that the components of the NAP enclosure 100 may be provided to a customer in an unassembled configuration as a kit such that the customer or another third party could assemble the NAP enclosure 100 in a desired configuration.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A network access point enclosure configured to sealingly house a splice tray that is configured to pivot to provide increased access to opposite sides of the splice tray during assembly, comprising:
   a base portion structurally configured to include a plurality of ports configured to receive fiber optic cables;
   a cover portion configured to be sealingly coupled with the base portion to form a housing;
   a retaining portion configured to be coupled with the base portion;
   a splice tray configured to be pivotally coupled with the retaining portion;
   wherein the splice tray is configured to be pivoted between a first orientation relative to the base portion and a second orientation relative to the base portion;
   wherein the splice tray is configured to form a larger angle relative to the base portion in the first orientation than in the second orientation;
   wherein the retaining portion includes a first engagement structure configured to receive a first portion of a support arm that extends from the splice tray to hold the splice tray in the first orientation;
   wherein the retaining portion includes a second engagement structure configured to receive a second portion of a support arm to hold the splice tray in the second orientation;
   wherein the retaining portion includes a plurality of openings aligned with the plurality of ports and configured to permit the fiber optic cables received in the plurality of ports to pass there through and maintain a minimum bend radius so as to prevent signal losses;
   wherein a coupling assembly is configured to couple each fiber optic cable with one of the plurality of ports such that the fiber optic cable is rotatingly and slidingly fixed relative to the one port;
   wherein the retaining portion is configured to be removed from the base portion when the cover portion is not attached to the base portion;
   wherein the splice tray is configured to provide increased access to a front side of the splice tray and a rear side of the splice tray in the first orientation relative to the second orientation;
   wherein the splice tray is configured to prevent the cover portion from being coupled with the base portion in the first orientation; and
   wherein the splice tray is configured to permit the cover portion to be sealingly coupled with the base portion in the second orientation.

2. The network access point enclosure of claim 1, wherein the cover portion is configured to be ultrasonically welded to the base portion.

3. The network access point enclosure of claim 1, further comprising a coupling assembly configured to couple a fiber optic cable with one of the ports of the base portion; and
   wherein the coupling assembly includes an adapter having a threaded interface port configured to receive a threaded coupler that is attached to and configured to rotate relative to the fiber optic cable.

4. The network access point enclosure of claim 1, wherein the fiber optic cable is configured to be sealingly coupled with the port with heat shrink.

5. The network access point enclosure of claim 1, wherein at least one of the plurality of ports is configured to sealingly receive a drop cable.

6. A network access point enclosure configured to sealingly house a splice tray that is configured to pivot to provide increased access to opposite sides of the splice tray during assembly, comprising:
   a base portion structurally configured to include a plurality of ports configured to receive fiber optic cables;
   a cover portion configured to be coupled with the base portion to form a housing;
   a retaining portion configured to be coupled with the base portion;
   a splice tray configured to be pivotally coupled with the retaining portion;
   wherein the splice tray is configured to be pivoted between a first orientation relative to the base portion and a second orientation relative to the base portion;
   wherein the splice tray is configured to form a larger angle relative to the base portion in the first orientation than in the second orientation;
   wherein the retaining portion includes a plurality of openings aligned with the plurality of ports and configured to permit the fiber optic cables received in the plurality of ports to pass there through and maintain a minimum bend radius so as to prevent signal losses;
   wherein each port is configured to couple with a fiber optic cable such that the fiber optic cable is rotatingly and slidingly fixed relative to the one port;
   wherein the splice tray is configured to provide increased access to a front side of the splice tray and a rear side of the splice tray in the first orientation than in the second orientation;

wherein the splice tray is configured to prevent the cover portion from being coupled with the base portion in the first orientation; and wherein the splice tray is configured to permit the cover portion to be sealingly coupled with the base portion in the second orientation.

7. The network access point enclosure of claim 6, wherein the retaining portion includes a first engagement structure configured to receive a first portion of a support arm that extends from the splice tray to hold the splice tray in the first orientation; and wherein the retaining portion includes a second engagement structure configured to receive a second portion of a support arm to hold the splice tray in the second orientation.

8. The network access point enclosure of claim 6, wherein the retaining portion is configured to be removed from the base portion when the cover portion is not attached to the base portion.

9. The network access point enclosure of claim 6, wherein the cover portion is configured to be sealingly coupled with the base portion.

10. The network access point enclosure of claim 9, wherein the cover portion is configured to be ultrasonically welded to the base portion.

11. The network access point enclosure of claim 6, further comprising a coupling assembly configured to couple a fiber optic cable with one of the ports of the base portion; and wherein the coupling assembly includes an adapter having a threaded interface port configured to receive a threaded coupler that is attached to and configured to rotate relative to the fiber optic cable.

12. The network access point enclosure of claim 6, wherein the fiber optic cable is configured to be sealingly coupled with the port with heat shrink.

13. The network access point enclosure of claim 6, wherein at least one of the plurality of ports is configured to sealingly receive a drop cable.

14. A network access point enclosure configured to sealingly house a splice tray that is configured to pivot to provide increased access to opposite sides of the splice tray during assembly, comprising:

a base portion structurally configured to include a plurality of ports configured to receive fiber optic cables;

a cover portion configured to be coupled with the base portion to form a housing;

a splice tray configured to be pivotally coupled with the base portion;

a support portion having a first end portion structurally configured to be pivotally coupled to the splice tray;

wherein the support portion has a second end portion that is structurally configured to be movable from a first engagement portion to a second engagement to permit the splice tray to be pivoted from a first orientation relative to the base portion to a second orientation relative to the base portion;

wherein the splice tray is configured to form a larger angle relative to the base portion in the first orientation than in the second orientation; and wherein the second end of the support portion is structurally configured to engage the first engagement portion such that the splice tray is maintained in the first orientation so as to provide increased access to a front side of the splice tray and a rear side of the splice tray in the first orientation than in the second orientation.

15. The network access point enclosure of claim 14, wherein the splice tray is configured to prevent the cover portion from being coupled with the base portion in the first orientation; and wherein the splice tray is configured to permit the cover portion to be sealingly coupled with the base portion in the second orientation.

16. The network access point enclosure of claim 14, further comprising a retaining portion configured to be coupled with the base portion.

17. The network access point enclosure of claim 16, wherein the retaining portion includes the first engagement portion and the second engagement portion.

18. The network access point enclosure of claim 17, wherein the retaining portion includes a third engagement portion structurally configured to receive a portion of a second support arm that extends from the splice tray to hold the splice tray in the second orientation.

19. The network access point enclosure of claim 16, wherein the retaining portion is configured to be removed from the base portion when the cover portion is not attached to the base portion.

20. The network access point enclosure of claim 14, wherein the cover portion is configured to be sealingly coupled with the base portion.

21. The network access point enclosure of claim 20, wherein the cover portion is configured to be ultrasonically welded to the base portion.

22. The network access point enclosure of claim 14, wherein each port is configured to couple with a fiber optic cable such that the fiber optic cable is rotatingly and slidingly fixed relative to the one port.

23. The network access point enclosure of claim 14, further comprising a coupling assembly configured to couple a fiber optic cable with one of the ports of the base portion; and wherein the coupling assembly includes an adapter having a threaded interface port configured to receive a threaded coupler that is attached to and configured to rotate relative to the fiber optic cable.

24. The network access point enclosure of claim 23, wherein the fiber optic cable is configured to be sealingly coupled with the port with heat shrink.

25. The network access point enclosure of claim 14, wherein at least one of the plurality of ports is configured to sealingly receive a drop cable.

26. The network access point enclosure of claim 16, wherein the retaining portion includes a plurality of openings aligned with the plurality of ports and configured to permit the fiber optic cables received in the plurality of ports to pass there through and maintain a minimum bend radius so as to prevent signal losses.

* * * * *